T. E. C. BRINLY.
Improvement in Harrows.
No. 126,779. Patented May 14, 1872.
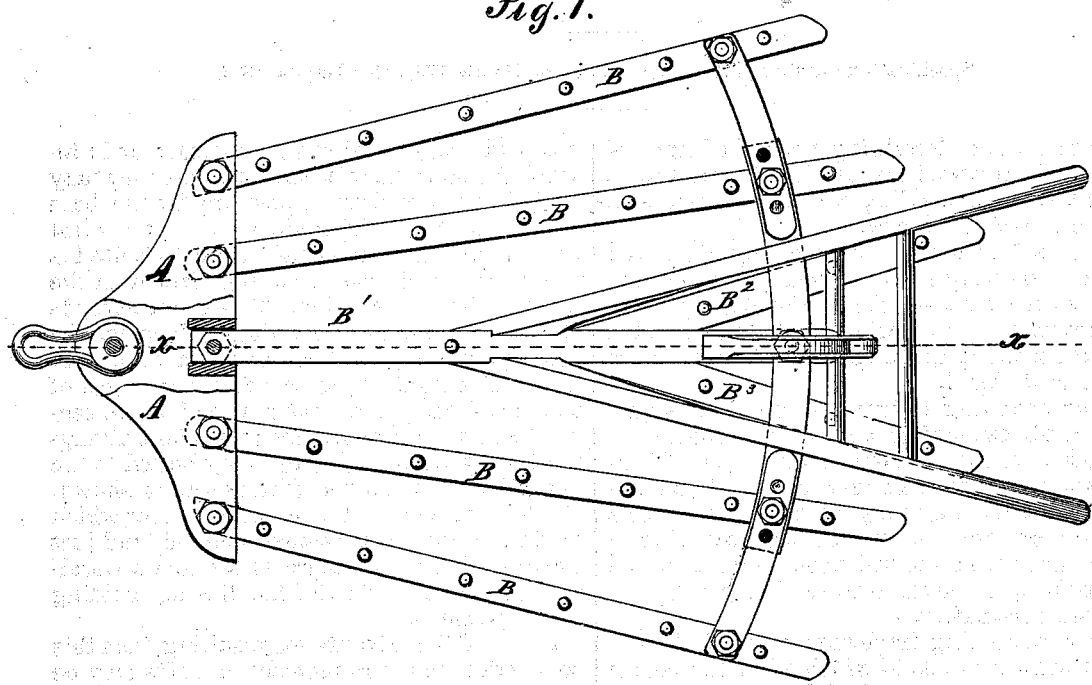
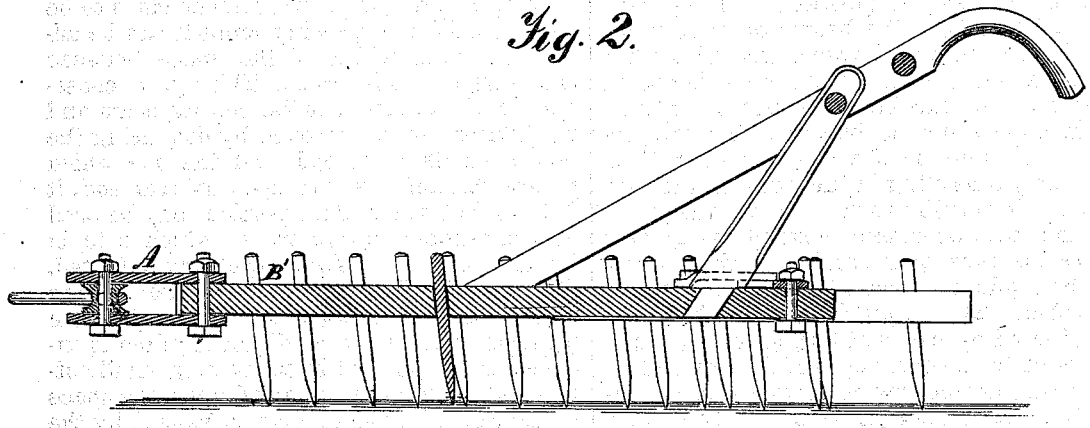

UNITED STATES PATENT OFFICE.

THOMAS E. C. BRINLY, OF LOUISVILLE, KENTUCKY.

IMPROVEMENT IN HARROWS.

Specification forming part of Letters Patent No. 126,779, dated May 14, 1872.

Specification describing a certain Improvement in Harrows, invented by THOMAS E. C. BRINLY, of Louisville, county of Jefferson, and State of Kentucky.

Figure 1 is a plan view of my improved harrow, showing the draw-head, to which the beams are attached, the means for adjusting the reversible side sections, and the removable central section; and Fig. 2 is an elevation on line $x\,x$ of Fig. 1.

Corresponding letters are used in designation of corresponding parts in both figures.

This invention relates to that type of harrows which have their rear ends made adjustable, so that they may be made to cover a greater or less area of surface, according to the character of the soil upon which they are to be used, its novel features being fully described hereinafter.

In constructing implements of this kind I use a draw-head, A, to which all of the beams or arms are attached, which head is composed of two plates of metal of substantially the form shown in Fig. 1, they being separated by a collar or ring of metal near their front edges, as shown in Fig. 2, a bolt passing through the plate and through the collar for the purpose of holding them in position. To the rear edges of this head the beams or arms B are bolted, they passing between the plates far enough to receive the bolts for uniting them together. The number of beams or arms in the example shown is four, and they are provided with teeth in the usual manner, their peculiarity consisting in the fact that they are arranged in pairs in such a manner that their rear ends may be caused to stand at a greater or less distance apart, and thus the harrow may be made to cover a greater or less area of surface. This adjustment of the beams B B is effected by means of bars of metal, which are bolted to the outer ones of the series, from which they extend inward for a distance sufficiently great to allow of their having a series of holes formed in their inner ends for the reception of bolts, which pass through them and through another bar of metal, which is secured to the stationary central beam, soon to be described. The bolts which pass through the front ends of the beams forming a pivot upon which they can turn, it follows that their rear ends may be thrown out from or in toward the stationary beam, and that they may be held in any desired position by the bars and bolts above referred to. To the central portion of the draw-head there is bolted a beam, $B^1$, which has a socket formed in the plate A for its reception. This beam extends rearward between the swinging beams, the socket which its front end enters holding it in a line at a right angle to the inner edges of the draw-head. Near the rear end of the central beam there are attached two short diverging beams, $B^2$ and $B^3$, they being bolted to the beam $B^1$, and supplied with teeth, as shown. To the rear end of the beam $B^1$ the bar which holds the swinging beams is bolted, and just forward of this bar there is secured a standard, which supports the handles for guiding the implement.

Some of the advantages resulting from this connection and arrangement of parts may be stated as follows: First, the construction of the draw-head forms a reliable support and pivotal point for the beams, and also for the attachment of the chain for drawing the implement. Secondly, the adjustable feature of the outer beams enables the operator to change their width, so that if the implement is to be used to cultivate growing crops it can be adjusted to the width of the space between the rows of such crops. Thirdly, in consequence of the fact that the central beam and its fixtures can be removed by displacing the bolt from its front end, and the one which passes through the bar upon its rear end, it follows that the central portion may be used as a one-horse cultivator, for which it is, in its detached condition, peculiarly adapted. Fourthly, the displacing of the central portion of the implement leaves the outer adjustable portions in the exact condition required to enable them to be used in cultivating small cotton-plants and other kinds of crops, the space in the center of the implement caused by the removal of the central beam leaving a space for such plants, while the two sections cultivate each side of the row.

Having thus fully described my invention, what I claim, and desire to secure by Letters Patent, is—

The herein-described combined harrow and cultivator, composed of the draw-head A, side beams B B, which are connected by bars permitting their lateral adjustment, and a central one-horse cultivator, $B^1$ $B^2$ $B^3$, held in fixed position by the draw-head and the bars connecting the beams B B, but capable of being detached and used separately, all substantially as specified.

In testimony whereof I have signed my name to this specification in the presence of two subscribing witnesses.

T. E. C. BRINLY.

Witnesses:
 WM. STINETT,
 JOHN WOLPERT.